United States Patent [19]

Ishimoto

[11] Patent Number: 4,739,232
[45] Date of Patent: Apr. 19, 1988

[54] POWER UNIT FOR A BATTERY-DRIVEN TOY

[75] Inventor: Zenichi Ishimoto, Tokyo, Japan

[73] Assignee: Nikko Co., Ltd., Tokyo, Japan

[21] Appl. No.: 13,844

[22] Filed: Feb. 12, 1987

[30] Foreign Application Priority Data

Feb. 21, 1986 [JP] Japan .............................. 61-22913[U]

[51] Int. Cl.⁴ ............................................. G05D 23/30
[52] U.S. Cl. ...................................... 318/473; 318/16; 318/471; 361/24
[58] Field of Search ................. 318/16, 334, 471, 472, 318/473, 783; 361/23, 25, 26, 27, 31, 32

[56] References Cited

U.S. PATENT DOCUMENTS

| | | | |
|---|---|---|---|
| 3,041,515 | 6/1962 | Vaughan | 361/32 X |
| 3,668,497 | 6/1972 | Freiberger et al. | 318/472 X |
| 3,794,896 | 2/1974 | Holt | 318/471 |
| 4,220,900 | 9/1980 | Mintz | 318/453 X |
| 4,488,094 | 12/1984 | Min et al. | 318/16 |

*Primary Examiner*—Bentsu Ro
*Attorney, Agent, or Firm*—Helfgott & Karas

[57] ABSTRACT

A power unit for a battery-driven toy containing a battery power source for energizing a driving means through a power switch and a controlling circuit is disclosed, in which the controlling circuit comprises a circuit element for controlling said driving means and its movable operative contact, said circuit element being provided with a thermo-switch and a reset circuit for setting said movable operative contact into an OFF position through said thermo-switch.

3 Claims, 1 Drawing Sheet

POWER UNIT FOR A BATTERY-DRIVEN TOY

FIELD OF THE INVENTION

This invention relates to an improvement in a power unit for a variety of running toys containing a battery, more particularly to a power unit of a safe circuit design for preventing excess heat generation in an electric circuit element of a controlling means when a power switch of a radio-controllable running toy is left in its ON state as would occur if the controlling means were energized by accident.

BACKGROUND OF THE INVENTION

In a running toy of a radio-controllable system, heretofore, a running body with a receiver and an operating device with a transmitter have respectively been provided with battery-power and power switches.

When such power switch is left in its ON state by accident in the conventional running toy, however, a controlling means upon receiving an external electric wave into a radio-receiver is energized to heat its electrical circuit element. This continued heating state of the electrical circuit element may cause its over-heating and hence danger of accidental fire.

Recently, a battery to be utilized for such type of toys has been improved in its service performance and capacity to such an extent that any mis-operation may cause serious problems of wasteful consumption of the power and the danger of fire accidents.

Accordingly, an object of the inventiin is to provide a power unit useful in a battery-driven toy for detecting a temperature of the heated electrical circuit element of the controlling means upon its energized state through an external signal when the battery power is left in its ON state through the mis-operation and for deenergizing the controlling means when the temperature exceeds a given constant level.

SUMMARY OF THE INVENTION

In order to achieve the above object, the invention provides a power unit for a battery-driven toy, which contains a battery power source for energizing a driving means through a power switch and a controlling circuit, characterized in that the controlling circuit comprises a circuit element for controlling said driving means and its movable operative contact, said circuit element being provided with a thermo-switch and a reset circuit for setting said movable operative contact into an OFF position through said thermo-switch.

In a power unit of such construction, the driving means may comprise an electric motor which is controlled by a sliding resistor provided with a movable contact operative through a servo-mechanism, said sliding resistor being provided with a thermo-switch which in turn is connected to said servo-mechanism for resetting the movable contact into an OFF position.

Alternatively, the driving means may comprise an electric motor which is controlled by a resistor provided with a movable contact operative through a relay circuit, said resistor being provided with a thermo-switch which in turn is connected to said relay circuit for its disenergization, thereby to reset the movable contact into an OFF position.

Further, the power unit according to the invention may be suitably applied to a battery-driven toy of a radio-controllable type having a wireless receiver.

In accordance with the power unit for the battery-driven toy of the invention, the driving means for the electric motor, with the battery, is provided at its controlling circuit, comprising, for example, a circuit element of resistors, with a thermo-switch, while the circuit element may be operated by a movable contact so that in the overheated state of the circuit element, through the mis-operation of the power unit, the thermo-switch may be operated to reset the movable contact to the OFF state, thereby to disenergize the circuit element and to shut the power from the driving means for ensuring the safety of this type of toy conveniently.

The invention will now be illustrated for its preferred embodiments in more detail herein-below with reference to the accompanying drawings.

PREFERRED EMBODIMENTS OF THE INVENTION

Figure 1:
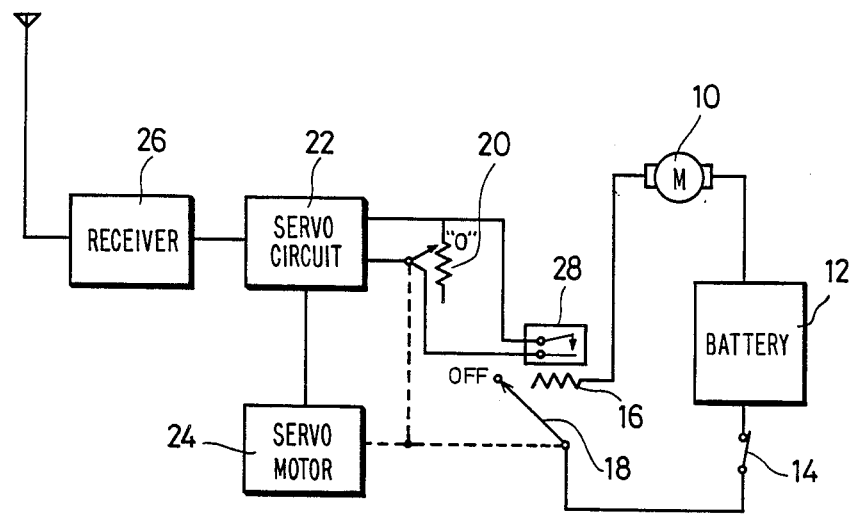
FIG. 1 shows a schematic electrical system for one embodiment of the power unit according to the invention.

FIG. 1 illustrates a schematic electrical system for a battery-driven toy of a radio-controllable type designed for controlling a driving electric motor through a servo-mechanism as one embodiment of the power unit according to the invention, in which numerical reference 10 represents a driving motor M for the toy provided with a driving circuit comprising a battery 12, a power switch 14, a sliding resistor 16, and a movable contact 18 for controlling the sliding resistor 16 through the servo-mechanism. This servo-mechanism includes a servo-circuit 22 having a potentiometer 20 and a servo-motor 24 and is operated by a required instruction signal through a wireless receiver 26. When the toy thus constructed receives the required instruction signal at its wireless receiver 26, the potentiometer 20 of the servo-circuit 22 may be actuated to operate the servo-motor 24 in response to an instruction value set by the potentiometer 20, thereby to position the movable contact 18 of the sliding resistor 16 (which constitutes the driving circuit of the driving motor 10) to said instruction value for driving the motor 10 depending thereon.

Figure 3:
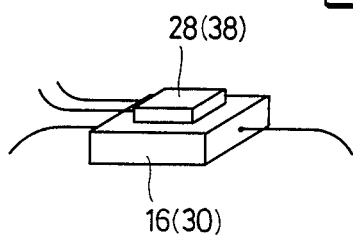
FIG. 3 is a perspective view of a mounted state of the thermo-switch, as shown in FIGS. 1 and 2.

The foregoing construction is identical to conventional common toys of a radio-controllable type. In accordance with the above embodiment of the invention, however, the sliding resistor 16 is provided with a thermo-switch 28 of a normally open contact type, as shown in FIG. 3, which has a terminal connected to the potentiometer 20 of the servo-circuit 22 in such a way that the servo-switch 28 may be in the ON state upon reaching the predetermined temperature thereby to reset the set value of the potentiometer 20 to zero. With such construction, when the power switch 14 is left on its ON state by accident, the wireless receiver 26 may receive an external electric wave and feed a signal to the servo-circuit 22, thereby to allow the potentiometer 20 to set a certain instruction value for operating the movable contact 18 against the sliding resistor 16 through the servo-motor 24. If such abnormal condition is continued, the sliding resistor 16 may generate heat to result in a dangerous condition. When the temperature increases to a certain level in response to the heat generation (for example 150° C.), however, the thermo-switch 28 may come to its ON state thereby to reset the potentiometer 20 of the servo-circuit 22 to the zero position. Thus, the servo-motor 24 may operate to immediately reset the movable contact 18 of the sliding resistor 16 to the OFF state and to shut the connection between the sliding resistor 16 and the battery 12.

Figure 2:
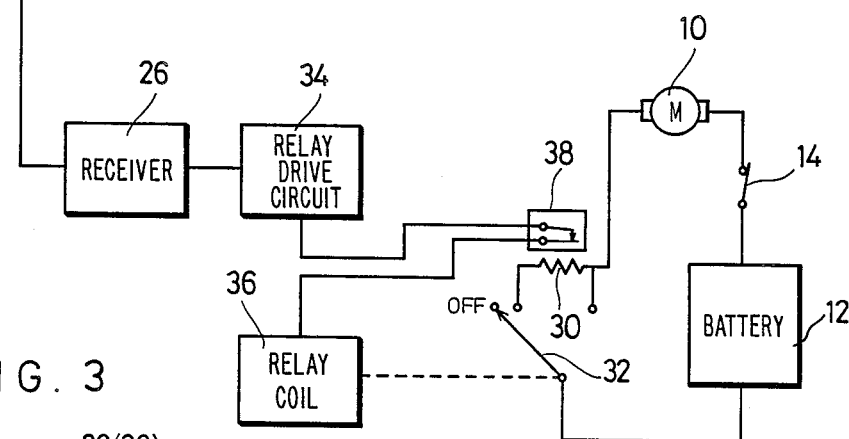
FIG. 2 shows a schematic electrical system for another embodiment of the power unit according to the invention.

FIG. 2 illustrates another embodiment of the power unit according to the invention, which shows a schematic electrical system for the battery-driven toy of a radio-controllable type in which a controlling resistor 30 of the driving motor 10 may be controlled by a relay circuit. In accordance with this embodiment, the resistor 30 is provided with a movable contact 32 which may be controlled by a relay coil 36 through a relay-driving circuit 34. Further, the resistor 30 is provided with a thermo-switch 38 of a normally closed contact type, as shown in FIG. 3, which has a terminal arranged between lines of the relay-driving circuit 34 and the relay coil 36. Similarly to the previous embodiment, when the resistor 30 is heated to a dangerous condition, the thermo-switch 38 may come to its OFF state to deenergize the relay coil 36 and thus to immediately reset the movable contact 32 of the resistor 30 to the OFF position, thereby to shut the connection between the resistor 30 and the battery 12.

It will be appreciated from the above embodiments of the battery-driven toy of a radio-controllable type according to the invention in which an external electric wave may be input to operate the controlling circuit of the driving motor, the arrangement of the thermo-switch at the electrical circuit element having suspected heat generation upon an accidental operation may bring the controlling circuit to the OFF state through operation of the thermo-switch to shut a power supply from the battery to the driving motor, thereby to ensure prevention of exhaustion of the battery and avoidance of excess heat generation in the electrical circuit element of the controlling circuit.

Although the above embodiments have described the motor-driven toys of a radio-controllable type having the thermo-switch as a safety element for the resistor controlling the driving motor, the power unit according to the invention is not limited thereto but may be widely applied to various battery-driven toys of a photo-communication type, a wire radio type and others, while the controlling element for mounting the thermo-switch and the circuit system for controlling the same may also be widely applied, of course.

What is claimed is:

1. A power unit for a battery-driven toy which contains a batter power source for energizing a driving means through a power switch and a movable operative contact, characterized in that the power unit includes control circuit comprising a reset circuit which includes a thermo-switch operatively associated with said movable operative contact, said reset circuit being effective on said thermo-switch reaching a predetermined temperature to move said movable contact to an OFF-position thereby to deenergize said driving means which comprises an electric motor, said movable operative contact being operatively related to a sliding resistor, said reset circuit including a servo-mechanism for operating the movable contact, said sliding resistor being operatively related to said thermo-switch which is operatively connected in said reset circuit to said servo-mechanism for setting the movable contact into its said OFF position.

2. A power unit for a battery-driven toy according to claim 1, wherein the toy is operated by a radio-controllable system having a wireless receiver.

3. A power unit for a battery-driven toy which contains a battery power source for energizing a driving means through a power switch and a movable operative contact, characterized in that the power unit includes a control circuit comprising a reset circuit which includes a thermo-switch operatively associated with said movable operative contact, said reset circuit being effective on said thermo-switch reaching a predetermined temperature to move said movable contact to an OFF-position thereby to deenergize said driving means which comprises an electric motor, said reset circuit comprising a relay circuit, energization of said motor being controlled by a resistor provided with said movable contact operative through said relay circuit, said resistor in turn being operatively related to said thermo-switch which is connected in said relay circuit for its deenergization to move the movable contact to its OFF position.

* * * * *